United States Patent [19]

Sekera, Jr.

[11] 3,850,407
[45] Nov. 26, 1974

[54] SAFETY VALVE
[75] Inventor: George F. Sekera, Jr., Hinsdale, Ill.
[73] Assignee: Harper-Wyman Company, Hinsdale, Ill.
[22] Filed: Aug. 8, 1973
[21] Appl. No.: 386,523

[52] U.S. Cl. ............ 251/242, 137/505.47, 236/99 G
[51] Int. Cl. ............................................ F16k 31/44
[58] Field of Search ........... 251/58, 78, 84, 86, 213,
 251/231, 233, 234, 236, 239, 240, 242, 243,
 244, 293, 336; 137/505.42, 505.46, 505.47;
 236/99 G, 102; 74/519, 522, 522.5

[56] References Cited
UNITED STATES PATENTS

| | | | |
|---|---|---|---|
| 3,251,573 | 5/1966 | Miller et al. | 251/58 X |
| 3,469,781 | 9/1969 | Sekera, Jr. | 236/99 G |

*Primary Examiner*—William R. Cline
*Assistant Examiner*—David R. Matthews
*Attorney, Agent, or Firm*—Mason, Kolehmainen, Rathburn & Wyss

[57] ABSTRACT

A safety valve includes a fluid chamber having an inlet and an outlet, and an annular valve seat defining a flow passage in said chamber between the inlet and outlet. A valve member in the chamber includes a recess on one side and is mounted for movement toward and away from the valve seat for closing and opening the flow passage. Biasing means urges the valve member in one direction relative to the seat, and valve actuator means urges the valve member in an opposite direction in response to a sensed condition. The actuator means includes a lever mounted for pivotal movement in the chamber about a pivot axis spaced from the valve member. The lever includes an integral pin struck from the body of the lever and extending from the body at a point spaced from the pivot axis and projecting into the recess in the valve member. Power means responsive to the sensed condition biases the lever to pivot about its axis in order to move the valve member in opposition to the biasing means.

7 Claims, 4 Drawing Figures

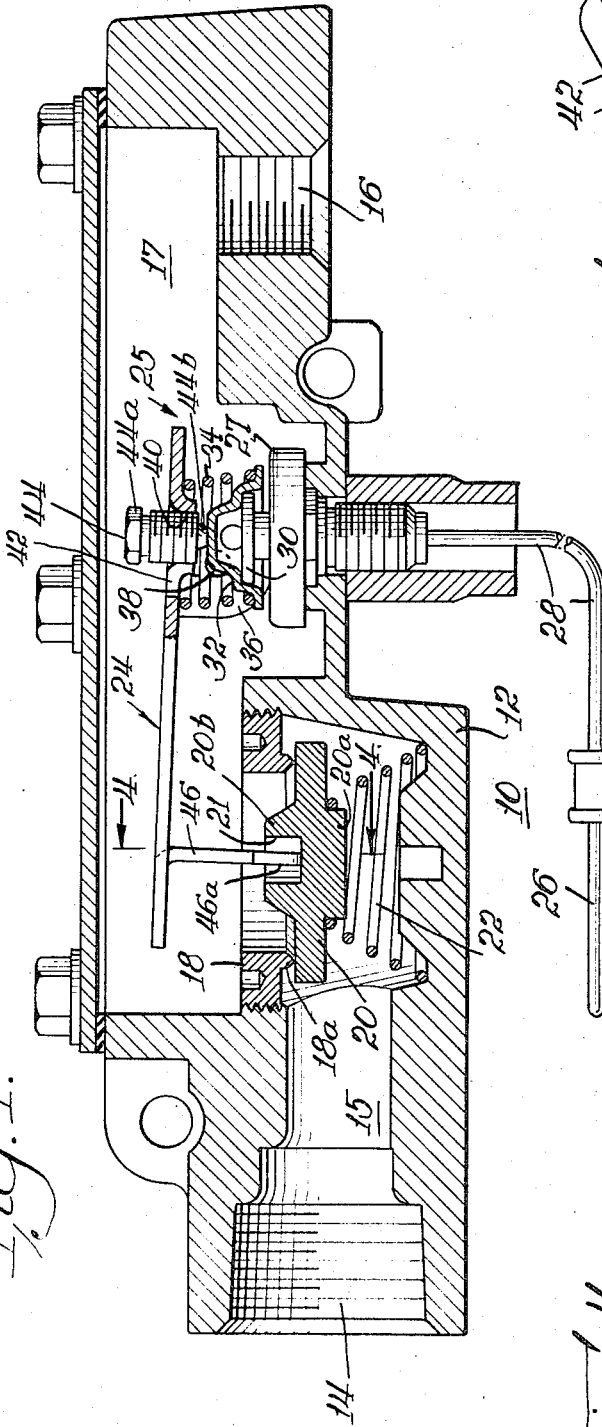

SAFETY VALVE

The present invention relates to a new and improved safety valve and more particularly, to a new and improved safety valve or burner control valve which has few parts, is readily manufactured and assembled on a mass production basis and has improved operating characteristics and reliability.

Fuel valves generally referred to as burner or safety valves are widely used in natural or LP gas ovens and other appliances for controlling the gas flow to a main burner in response to a sensed condition such as the presence or absence of a flame indication at a pilot burner.

One type of such valve is disclosed in U.S. Pat. No. 3,469,781 assigned to the same assignee as the present application and includes a power element which is mounted on an expansible diaphragm or other condition responsive means movable between positions dependent upon the presence or absence of a sensed condition such as a flame at a pilot burner. A valve member is moved between a closed position and a fully open position in response to movement of the power element by means of a lever pivotally secured in the valve housing and activated by the power element. In such arrangements the lever acts as a distance multiplier because the power element normally moves a very short distance in response to changing conditions at the pilot burner.

It is an object of the present invention to provide a new and improved safety valve or burner control valve which is fail safe in operation, economical to produce on a mass production basis, and which overcomes many disadvantages of prior known valves of the general character.

Another object of the present invention is to provide a new and improved safety valve of the character described and which requires fewer parts to be assembled and which includes a novel integral lever construction which is formed in one piece for pivotal support in the valve housing and direct engagement with a movable valve member.

Another object of the invention is to provide a new and improved safety valve of the character described having a lever with an integrally struck pin engaging directly and moving a spring biased valve element between open and closed position in response to a sensed condition.

Another object of the present invention is to provide a new and improved actuating lever or safety valve of the character described which lever is formed of one piece of sheet material and requires no pins or other members for interconnecting assembly between the lever and the valve member actuated thereby.

Briefly the foregoing and other objects and advantages of the present invention are accomplished in a new and improved safety valve having a fluid chamber with an inlet and an outlet and an annular valve seat defining a flow passage in said chamber between said inlet and outlet. A valve member is mounted in the chamber for movement toward and away from said valve seat for closing and opening the flow passage and includes a centrally positioned recess on one side. Spring biasing means is provided for urging said valve in one direction relative to said seat and a valve actuator means comprising a lever mounted for pivotal movement in the chamber is in direct engagement with the valve member for biasing the same in a direction opposite that of the spring biasing means in response to a sensed condition. Power means for sensing an external condition such as the presence or absence of a burner flame at a pilot burner or the like is provided to pivot the lever. Should the power means fail, the lever is biased to a fail safe condition and the improved connection between the lever and the valve member prevents hangups or binding engagement which might otherwise permit the valve member to remain open or partially open after failure of the power means has occurred.

For a better understanding of the present invention reference should be had to the detailed description taken in conjunction with the claims and drawings, in which:

FIG. 1 is a longitudinal cross sectional view of a new and improved safety valve constructed in accordance with the features of the present invention;

FIG. 2 is a top plan view of a new and improved valve member actuating lever constructed in accordance with the features of the present invention;

FIG. 3 is a perspective view illustrating the valve actuating lever in its engaged relation with the valve member; and FIG. 4 is a fragmentary, cross sectional view taken substantially along lines 4—4 of FIG. 1.

Referring now more particularly to the drawings, therein is illustrated a new and improved gas burner safety valve constructed in accordance with the features of the present invention and generally referred to by the numeral 10. The valve 10 is an improvement over the valve shown and described in U.S. Pat. No. 3,469,781 which is incorporated herein by reference. The valve 10 includes a housing 12 defining a valve chamber haVing an inlet 14 and an outlet 16 in communication with one another through an annular valve seat 18 which defines a circular flow passage therethrough and is threaded externally for removable seating within the valve chamber. The chamber is divided by the seat into an inlet section 15 and an outlet section 17 and gas flow through the circular flow passage in the valve seat 18 is controlled by a movable valve member 20 mounted in the inlet section 15 for movement toward and away from a depending annular seat ring 18a formed on the underside of the valve seat.

The valve member 20 includes a circular disc-like body with a smaller diameter integral cylindrical boss 20a on the underside thereof. The boss is engaged by and is centered by an uppermost coil or turn of a valve biasing spring 22 having frustroconical windings and having a lower turn or convolution which is seated within an annular groove coaxially aligned with the valve seat 18 and formed in the bottom wall of the inlet section 15. The conical valve spring 22 has a dual function of biasing the valve 20 towards a normally closed position against the seat ring 18a on the underside of the valve seat 18 and at the same time the spring also serves as centering means for maintaining the valve member in coaxial alignment with the center axis of circular flow passage in the valve seat.

Flow through the flow passage of the valve seat 18 between the inlet 14 and outlet 16 is controlled in accordanCe with a sensed external condition and a pivotally mounted lever 24 is provided to move the valve member in response to the movement of a power element generally referred to by the reference numeral 25.

Referring to FIG. 1, therein is schematically illustrated a sensing system for the valve 10. The inlet 14 is adapted to be supplied with fuel from a suitable source and the outlet 16 is in communication with a burner or the like (not shown) associated with a pilot burner (not shown) used for ignition of the fuel at the main burner. The valve 10 functions to admit fuel to the main burner from the outlet 16 only when a temperature sensing means 26 disposed adjacent the pilot burner, is heated by a flame present at the pilot burner. The sensing means is heated by the presence of a flame at the pilot burner and activates the power element 25 which expands and causes the valve lever 24 to pivot in a counterclockwise direction as shown in FIG. 1 to open the valve 20 away from the seat ring 18a and admit gas flow between the inlet chamber 15 and the outlet chamber 17. The power element 25 includes an expansion chamber 27 filled with fluid and in communication with the temperature sensing bulb 26 at the pilot burner via a fluid capillary tube 28. As the chamber 27 expands and contracts in response to the temperature condition sensed by the bulb 26 and transmitted via the capillary tube 28, the upper wall thereof which carries a platform member 30 moves up and down in the housing. The member 30 comprises a circular disc seated within an inverted cup-like member 32 which is adapted to bias the lever 24 about a transverse pivot axis. An external spring 34 is provided between the right hand end of the lever 24 and the lower outermost flange or lip on the cup element 32 to urge the two members away from one another.

In accordance with the present invention, the lever 24 is formed of a single piece integrally formed sheet metal stamped and die cut to shape (preferably in a punch press operation). The lever is provided with a pair of downwardly depending J-shaped pivot hooks 36 formed on opposite sides of the main body of the lever for pivotally supporting the lever in the housing section 17. A pair of short pivot pins or bosses 38 are formed on opposite side walls of the chamber section 17 and these engage the throats of the J-shaped hook portions 36 of the lever 24. The lever is pivotally supported with its main body biased upwardly by the spring 34 on the right hand end portion and is spaced above the transverse pivot axis of the bosses 38. To the right of the transverse pivot axis, the lever body is formed with a circular threaded opening 40 having radial slits 42 and downturned internally threaded flange segments for receiving an externally threaded adjustable set screw 44. The set screw 44 includes a hexagonal shaped flated upper end or head 44a for receiving a wrench or the like for adjustment and is formed with a depending tip 44b at the lower end adapted to bear against the upper wall of the inverted cup member 32. Adjustment of the set screw 44 compensates for manufacturing tolerances and insures that the J-hook portions 36 of the lever 24 are positively engaged on the pivot pins 38 on the side walls of the outlet chamber 17. It should also be noted that the point of contact between the lower tip 44b of the set screw 44 and the cup member 32 is spaced to the right hand side of the pivot axis of the lever 24 and that tightening of the set screw thus tends to bias the left hand end of the lever 24 downwardly to open the valve 20 against the influence of the valve spring 22. Reference should be had to the previously mentioned U.S. Pat. No. 3,469,781 for a more detailed description of the set screw adjustment.

In accordance with the invention the new and improved valve lever 24 is formed with a downwardly depending tongue 46 positioned to the left of the pivot axis and integrally struck out from the central longitudinal portion of the lever body. Because the tongue is integrally formed no additional staking, forming or other interconnecting assembly operations are required to provide a suitable mechanical connection between the left hand end of the lever 24 and the valve member 20. The valve member 20 is formed with a frustroconical boss 20b on the upper surface thereof and a circular recess 21 is centered therein for receiving a lower end portion 46a of the integral tongue. As best shown in FIG. 4 the lower end portion 46a of the tongue is provided with chamferred or rounded corners and is of relatively narrow width in comparison to the diameter of the recess 21 in which it is seated so that the possibility of misalignment resulting in binding between the lever and valve element 20 is minimized. The frustroconically shaped valve spring 22 normally biases the valve 20 towards the closed position and at the same time tends to center the valve coaxially with respect to the central axis of the circular flow passage in the valve seat ring 18. The tongue 46a which depends downwardly into the recess 21 on the upper boss 20b of the valve member is in a free and loose fitting relation with the valve member and functions to move the valve member away from the valve seat ring 18 in response to a sensed condition. The loose fit also permits the valve member to be moved toward the valve seat ring 18 by the spring 22 when the requisite condition is not sensed by the bulb 26.

This unique combination and cooperation between the lever, valve member and other operating elements is of simple construction, low in cost, and lends itself readily to manufacture and assembly with mass production processes. At the same time, the chance of binding or other mechanical hangup between the lever and the valve member are substantially reduced. The result is an improved economical and fail safe construction which makes it virtually impossible for the valve 20 to stick in an open or partially open position. The valve lever 24 is of cheaper and lighter construction than heretofore possible because of the fact that the valve lever is constructed from an integrally formed single piece of sheet material without requiring staking or attachment of pins or other member thereto for making engagement with the valve member.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A safety valve comprising a fluid chamber having an inlet and an outlet, an annular valve seat defining a flow passage in said chamber between said inlet and outlet, a valve member including a recess on one side thereof and mounted for movement toward and away from said valve seat for closing and opening said flow passage, biasing means urging said valve member in one direction relative to said seat and valve actuator means urging said valve member in a direction opposite to said one direction in response to a sensed condition, said actuator means comprising a lever mounted for pivotal movement in said chamber about an axis spaced from said valve member, said lever including a body and an integrally formed tongue extending from said body at a point spaced from said axis, said tongue projecting into said recess of said valve member for moving the same, and power means responsive to said sensed condition for biasing said lever to pivot about said axis.

2. The safety valve of claim 1, said tongue extending generally normal to the body of said lever.

3. The safety valve of claim 2, said recess being positioned centrally of said valve member.

4. The safety valve of claim 1 wherein said tongue is struck from said body of said lever and includes a narrow width end portion dimensioned to loosely fit within said recess of said valve member without binding.

5. The safety valve of claim 4 wherein said lever includes an internally threaded flange integrally struck from said body and spaced longitudinally thereof from said tongue and an adjustable set screw seated in said flange for biasing said lever in a direction opposing the bias of said biasing means.

6. The safety valve of claim 4 wherein said valve member comprises a circular valve disc having an integrally formed frustroconical boss on one side thereof, said recess formed in said boss in coaxial alignment with the same.

7. The safety valve of claim 6 wherein said valve member includes a circular boss on the opposite side of said disc, said biasing means comprising a coil spring having an end coil encircling said circular boss and another end coil at the opposite end seated in a groove formed in said chamber.

* * * * *